United States Patent
Kobayashi

(10) Patent No.: US 11,044,434 B2
(45) Date of Patent: Jun. 22, 2021

(54) IMAGE SENSOR AND CONTROL METHOD THEREOF, AND IMAGE CAPTURING APPARATUS

(71) Applicant: CANON KABUSHIKI KAISHA, Tokyo (JP)

(72) Inventor: Hirokazu Kobayashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/744,317

(22) Filed: Jan. 16, 2020

(65) Prior Publication Data
US 2020/0252565 A1 Aug. 6, 2020

(30) Foreign Application Priority Data
Feb. 4, 2019 (JP) .............................. JP2019-018258

(51) Int. Cl.
*H04N 5/378* (2011.01)
*H04N 5/351* (2011.01)
*H04N 5/369* (2011.01)
*H04N 5/3745* (2011.01)

(52) U.S. Cl.
CPC ............. *H04N 5/378* (2013.01); *H04N 5/351* (2013.01); *H04N 5/379* (2018.08)

(58) Field of Classification Search
CPC ........ H04N 5/378; H04N 5/351; H04N 5/379; H04N 5/37455; H04N 7/188; H04N 5/341; H04N 5/235; H04N 5/23245; H04N 5/23251; H04N 5/23254; H04N 5/33; H04N 5/369; H04N 5/374; H04N 5/3745; H04N 5/37452
See application file for complete search history.

(56) References Cited

U.S. PATENT DOCUMENTS

| | | | |
|---|---|---|---|
| 6,498,576 B1* | 12/2002 | Tian ....................... | H04N 5/335 341/155 |
| 8,970,757 B2 | 3/2015 | Kobayashi | |
| 9,674,468 B2 | 6/2017 | Kobayashi | |
| 10,063,762 B2 | 8/2018 | Kobayashi et al. | |
| 10,368,018 B2 | 7/2019 | Kobayashi et al. | |
| 10,498,322 B1* | 12/2019 | Ebihara ................... | H03M 1/56 |
| 2009/0256936 A1* | 10/2009 | Sonoda ............. | H04N 5/37455 348/294 |

(Continued)

FOREIGN PATENT DOCUMENTS

JP 2018-022935 A 2/2018

*Primary Examiner* — Albert H Cutler
(74) *Attorney, Agent, or Firm* — Venable LLP

(57) ABSTRACT

An image sensor having a plurality of pixels each of which comprises: a photoelectric converter that repeatedly generates charge corresponding to an amount of incident light; an A/D converter that A/D converts a voltage corresponding to the charge generated by the photoelectric converter into a digital signal by comparing the voltage with a reference voltage that changes with lapse of time; a capacitor that holds a threshold voltage based on the voltage corresponding to the charge; and a switching circuit that switches whether to perform A/D conversion on a voltage that corresponds to newly generated charge by the photoelectric converter based on a comparison result between the voltage that corresponds to the newly generated charge and the threshold voltage held in the capacitor.

16 Claims, 14 Drawing Sheets

(56) References Cited

U.S. PATENT DOCUMENTS

| | | | |
|---|---|---|---|
| 2015/0049231 A1* | 2/2015 | Chen | H04N 5/3742 |
| | | | 348/308 |
| 2015/0070544 A1* | 3/2015 | Smith | H01L 27/14627 |
| | | | 348/297 |
| 2016/0269666 A1* | 9/2016 | Guidash | H04N 5/23245 |
| 2017/0214877 A1* | 7/2017 | Shim | H01L 27/14612 |
| 2017/0272678 A1* | 9/2017 | Sakakibara | H03K 5/2481 |
| 2019/0104273 A1* | 4/2019 | Sato | H04N 5/341 |
| 2019/0268532 A1 | 8/2019 | Iinuma | |
| 2021/0067168 A1* | 3/2021 | Kitano | H04N 5/361 |

\* cited by examiner

IMAGE SENSOR AND CONTROL METHOD THEREOF, AND IMAGE CAPTURING APPARATUS

BACKGROUND OF THE INVENTION

Field of the Invention

The present invention relates to an image sensor and control method thereof, and an image capturing apparatus, and more particularly to an image sensor having an A/D converter for each pixel and control method thereof, and an image capturing apparatus.

Description of the Related Art

Conventionally, an image capturing apparatus that detects the presence or absence of an event such as the movement of a subject and records an image based on the presence or absence of the event is known.

Japanese Patent Laid-Open No. 2018-22935 discloses an image capturing apparatus that has a pixel addition mode in which pixel addition is performed and a normal mode in which pixel addition is not performed. When the number of events occurred is less than a predetermined number, the normal mode is used, and when no event occurs or the number of events is equal to or greater than a predetermined number, the pixel addition mode is used. It is described that power consumption is reduced in an image capturing apparatus capable of detecting the presence or absence of an event by controlling it in this way.

However, in the method described in Japanese Patent Laid-Open No. 2018-22935, since the pixel addition mode is used when the number of events occurred is equal to or greater than a predetermined number, the number of A/D conversions is reduced and power consumption is reduced, but it is difficult to detect events with high accuracy using the pixel-added images. On the other hand, in the normal mode, events cannot be detected as frequently as in the pixel addition mode.

SUMMARY OF THE INVENTION

The present invention has been made in consideration of the above situation, and detects movement of a subject at high speed for each pixel and reduces the number of A/D conversions to be performed.

According to the present invention, provided is an image sensor having a plurality of pixels each of which comprising: a photoelectric converter that repeatedly generates charge corresponding to an amount of incident light; an A/D converter that A/D converts a voltage corresponding to the charge generated by the photoelectric converter into a digital signal by comparing the voltage with a reference voltage that changes with a lapse of time; a capacitor that holds a threshold voltage based on the voltage corresponding to the charge; and a switching circuit that switches whether to perform A/D conversion on a voltage that corresponds to newly generated charge by the photoelectric converter based on a comparison result between the voltage that corresponds to the newly generated charge and the threshold voltage held in the capacitor.

According to the present invention, provided is an image capturing apparatus comprising: an image sensor having a plurality of pixels each of which comprising a photoelectric converter that repeatedly generates charge corresponding to an amount of incident light, an A/D converter that A/D converts a voltage corresponding to the charge generated by the photoelectric converter into a digital signal by comparing the voltage with a reference voltage that changes with lapse of time, a capacitor that holds a threshold voltage based on the voltage corresponding to the charge, and a switching circuit that switches whether to perform A/D conversion on a voltage that corresponds to newly generated charge by the photoelectric converter based on a comparison result between the voltage that corresponds to the newly generated charge and the threshold voltage held in the capacitor; and an image processing circuit that constructs a new image by updating a pixel value of an image of an immediately previous frame with a pixel value obtained by the A/D conversion.

According to the present invention, provided is a control method of an image sensor having a plurality of pixels, comprising, in each of the pixels: repeatedly generating charge corresponding to an amount of incident light by a photoelectric converter; A/D converting by an A/D converter a voltage corresponding to the charge generated by the photoelectric converter into a digital signal by comparing the voltage with a reference voltage that changes with lapse of time; holding a threshold voltage based on the voltage corresponding to the charge in a capacitor; and switching by a switching circuit whether to perform A/D conversion on a voltage that corresponds to newly generated charge by the photoelectric converter based on a comparison result between the voltage that corresponds to the newly generated charge and the threshold voltage held in the capacitor.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
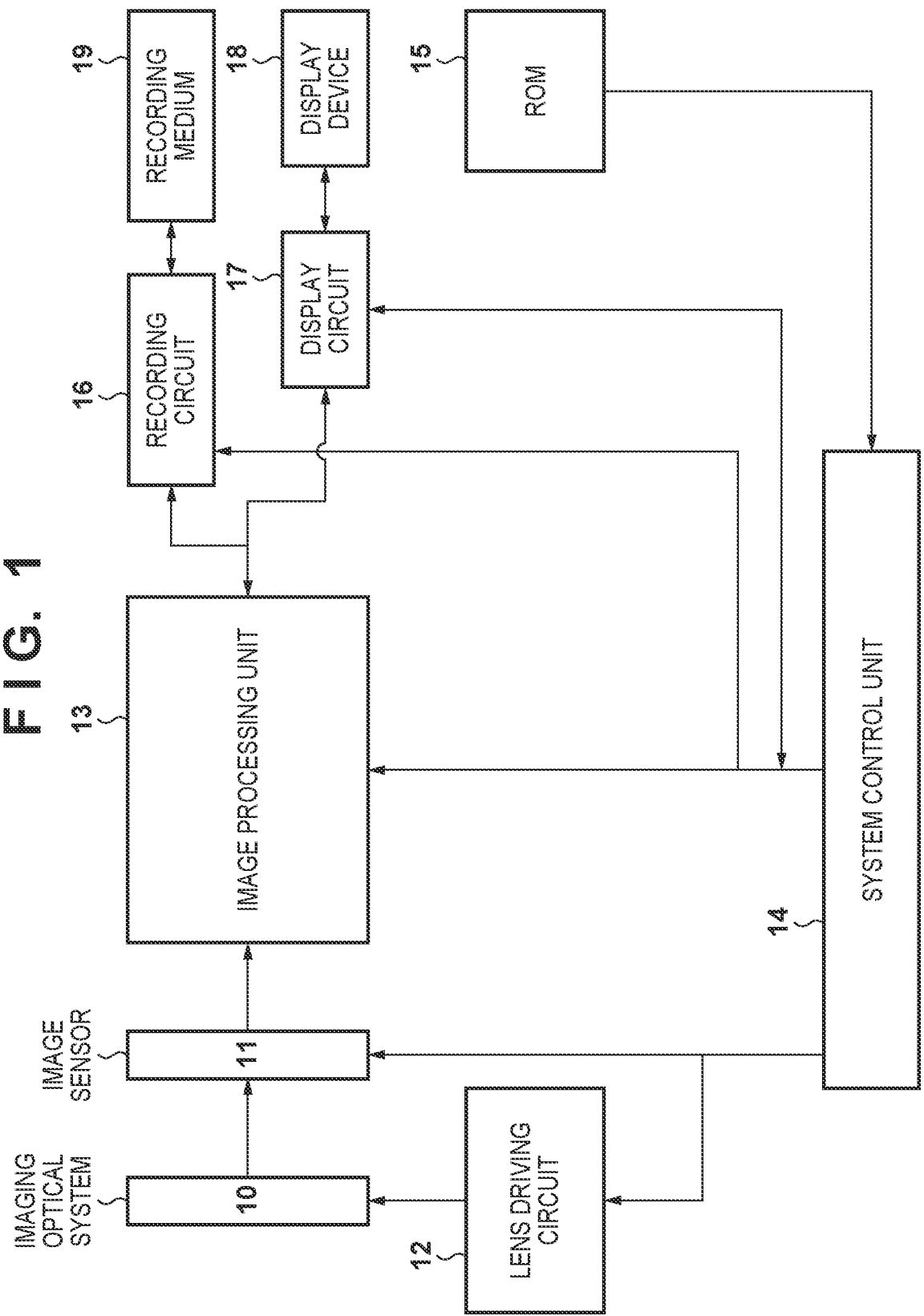
FIG. 1 is a block diagram showing a schematic configuration of an image capturing apparatus according to an embodiment of the present invention.

Hereinafter, embodiments will be described in detail with reference to the accompanying drawings. The following embodiments do not limit the invention according to the claims, and the combination of all features described in the embodiments is not necessarily essential to the invention. Two or more features of the plurality of features described in the embodiments may be arbitrarily combined. The same or similar components are denoted by the same reference numerals, and redundant description is omitted.

First, an image capturing apparatus according to an embodiment of the present invention will be described. FIG. 1 is a block diagram illustrating an example of a configuration of an image capturing apparatus according to the present invention.

An imaging optical system 10 includes a plurality of lenses such as a zoom lens and a focus lens, and is controlled by a system control unit 14 described later via a lens driving circuit 12. An image sensor 11 includes a plurality of pixels, receives light incident via the imaging optical system 10, and converts it into a voltage corresponding to the light amount. The voltage obtained at each pixel is A/D-converted, and pixel information including a pixel value of each pixel obtained by A/D conversion is sent to an image processing unit 13. The pixel information sent here includes coordinate information related to the coordinates of each pixel in addition to the pixel value of each pixel.

The image processing unit 13 performs predetermined image processing such as white balance correction, three-surface synchronization processing, noise reduction processing, and sharpness adjustment on the pixel value obtained from the image sensor 11, and outputs image data. The image sensor 11 has an ability of shooting a moving image, and the image processing unit 13 reconstructs an image based on the pixel values of the previous frame, the pixel values of the current frame, and the coordinate information in a case of shooting a moving image. This image reconstruction processing will be described later in detail.

The image data subjected to image processing by the image processing unit 13 is compressed in a recording circuit 16 based on a standard such as JPEG or MPEG, and then recorded on a recording medium 19.

Further, display format, such as 8K UHDTV, 4K, HDTV, resolution, frame rate, luminance range, and color gamut, of the image data output from the image processing unit 13 may be adjusted by a display circuit 17, and the processed image data may be displayed on a display device 18. The display device 18 may be configured integrally with the image capturing apparatus of the present embodiment, or may be configured separately from the image capturing apparatus and connected via a connection terminal.

The system control unit 14 executes a program that controls the entire image capturing apparatus. Note that all or part of the control program may be stored in a ROM 15 and a program necessary for each control mode may be read and executed. Further, the system control unit 14 can perform exposure control and AF control by performing a predetermined calculation on the image data obtained from the image processing unit 13. Further, it is also possible to accept the designation of zoom, focus, etc. from operating members (not shown) and control the imaging optical system 10 via the lens driving circuit 12.

Figure 2:
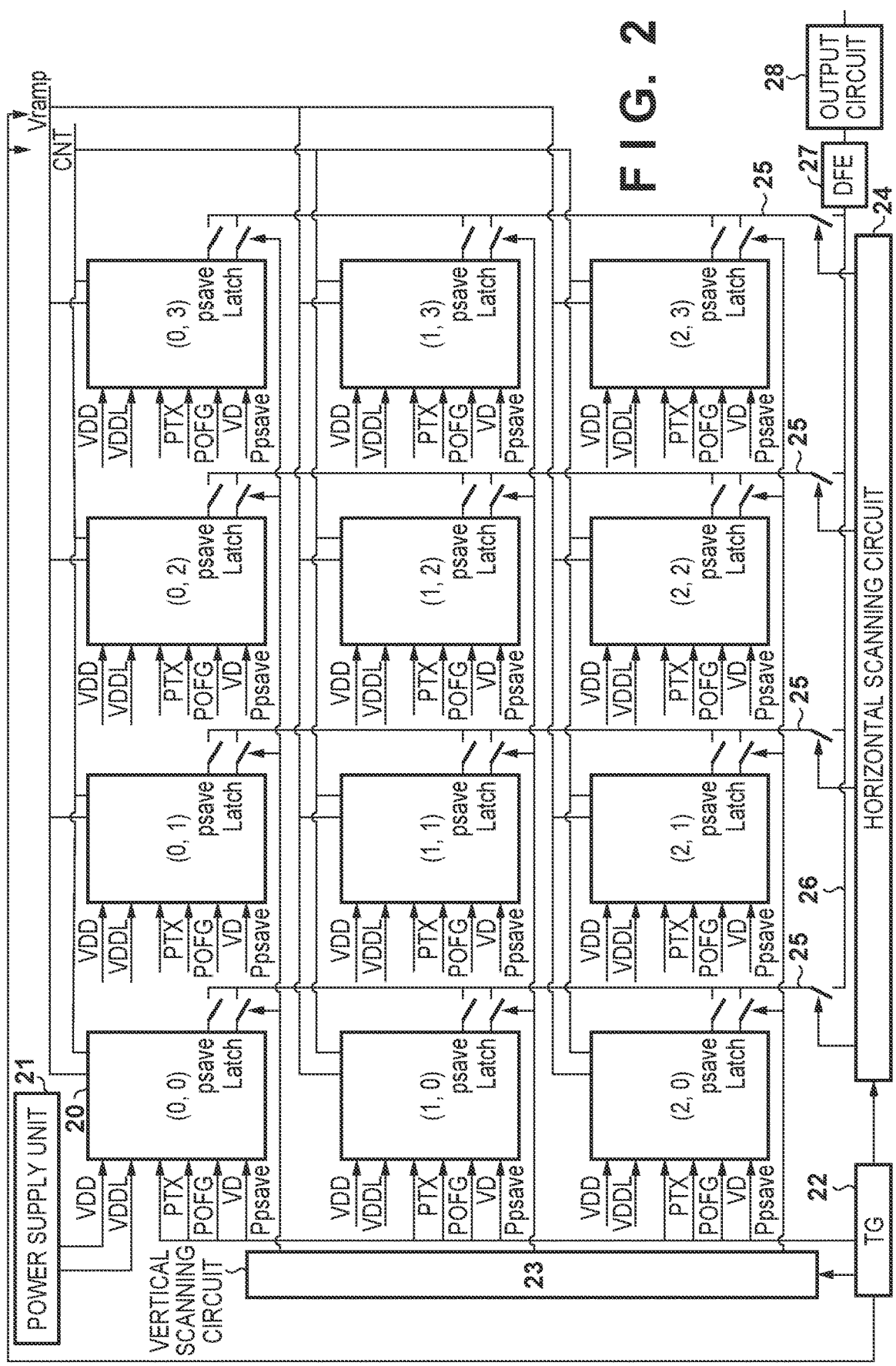
FIG. 2 is a block diagram showing an example of a configuration of an image sensor according to the embodiment.

Next, the configuration of the image sensor 11 according to the present embodiment will be described. FIG. 2 is a block diagram illustrating a configuration example of the image sensor 11 according to the present embodiment. In the example shown in FIG. 2, for simplification of the drawing, the pixels 20 corresponding to 3 rows and 4 columns are shown, however a very large number of pixels are arranged in practice. Further, (p, q) shown in parentheses in the pixel 20 represents a pixel existing in the p-th row and the q-th column among the pixels arranged two-dimensionally in the vertical and horizontal directions. Although the detailed configuration will be described later, each pixel 20 includes a photoelectric conversion element such as a photodiode that photoelectrically converts incident light, and an A/D conversion unit that converts an analog signal obtained by the photoelectric conversion element into a digital signal.

A power supply unit 21 supplies various voltages to the image sensor 11 via a power supply pin (not shown). The power supply unit 21 may be configured outside the image sensor 11.

A timing generation circuit (TG) 22 generates various timing signals such as a vertical synchronization signal VD under the control of the system control unit 14 of the image capturing apparatus, and provide the timing signals to each pixel 20, a vertical scanning circuit 23, and a horizontal scanning circuit 24. Based on the timing signals from the TG 22, the vertical scanning circuit 23 controls the pixel 20 (p, q), and the horizontal scanning circuit 24 reads out the information relating to A/D-converted captured image signals and coordinates of the A/D-converted signals that appear at a Latch terminal and a psave terminal of the pixel 20 (p, q). More specifically, the vertical scanning circuit 23 sequentially turns on the switches connected to the Latch terminals and the psave terminals of the pixels 20 (p, q) in the p-th row, thereby pixel information related to the pixel value and the coordinates of the A/D-converted pixel value is output to the vertical signal line 25 of each column. Thereafter, the horizontal scanning circuit 24 sequentially connects the vertical signal lines 25 to a horizontal signal line 26 with a switch, thereby outputting information of each pixel to a digital front end (DFE) 27.

The DFE 27 performs processing effective for image reconstruction, which will be described later, such as correction of pixel value and coordinate information of A/D-converted pixels.

An output circuit 28 performs parallel-serial conversion on the processed pixel value, converts the pixel value into a high-speed serial transmission format such as a well-known LVDS (Low Voltage Differential Signal), attaches the coordinate information of the A/D-converted pixel to the pixel value, and outputs the pixel information.

First Embodiment

Next, a first embodiment of the present invention will be described.

Pixel Configuration

First, the configuration of each pixel 20 of the image sensor 11 in the first embodiment will be described with reference to the equivalent circuit diagram of FIG. 3.

Figure 3:
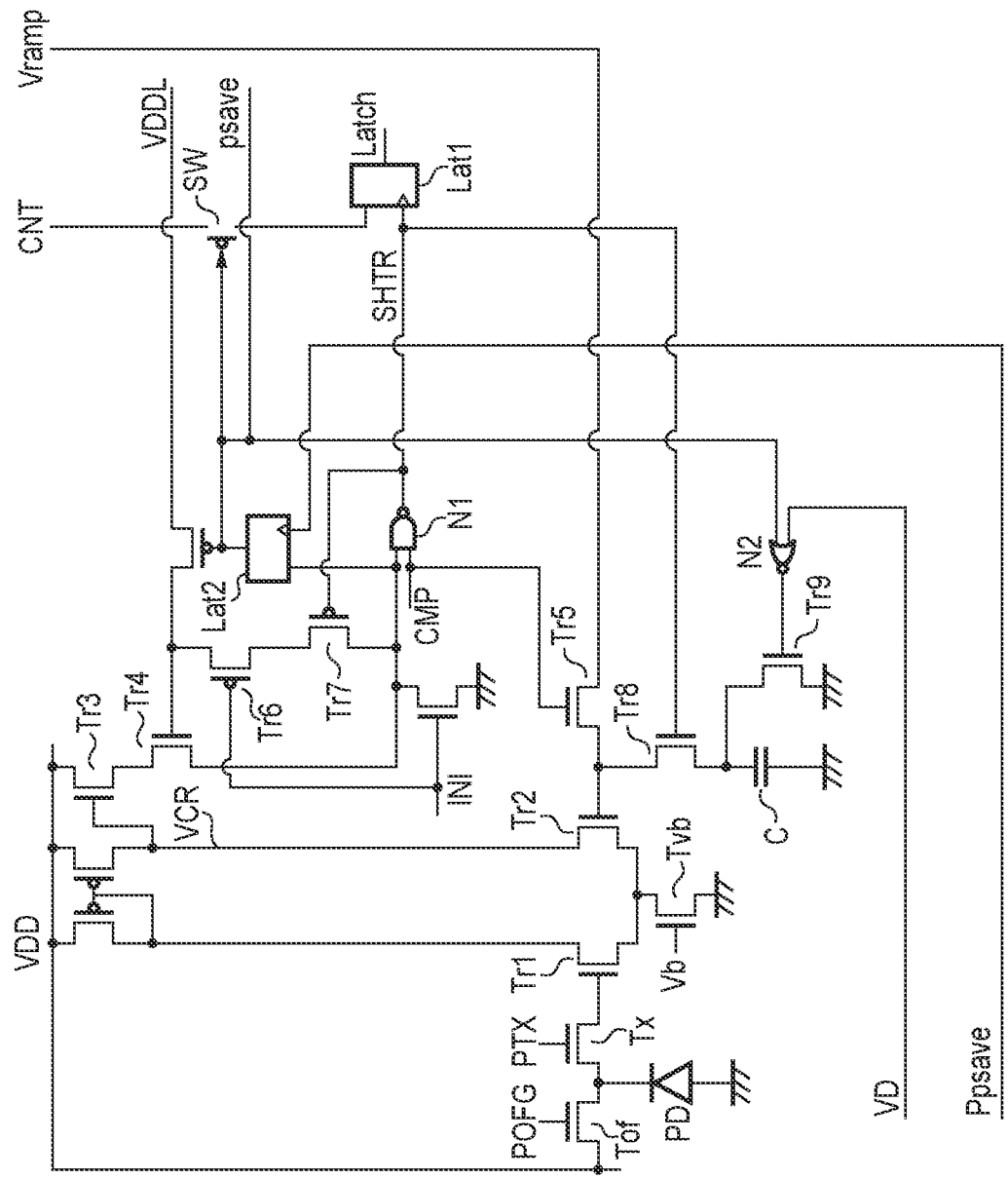
FIG. 3 is an equivalent circuit diagram illustrating a configuration of each pixel of the image sensor according to a first embodiment.

In FIG. 3, a photoelectric converter PD such as a photodiode receives light formed by the imaging optical system 10 of the image capturing apparatus and performs photoelectric conversion. The signal voltage corresponding to the signal charge generated in the photoelectric converter PD is input to the gate of a first transistor Tr1 through a transfer transistor Tx that receives a transfer control signal PTX at the gate. The first transistor Tr1 forms a differential pair with a second transistor Tr2 that receives a reference voltage Vramp, which is a ramp signal that changes with time, at the gate. A transistor Tvb receiving a constant voltage Vb at the gate functions as a load of this differential pair.

The photoelectric converter PD can also discharge the signal charge to the drain via a transistor Tof that receives a overflow gate (OFG) control signal POFG at the gate. The drain is connected to a power supply voltage VDD, for example.

The power supply voltage VDD is also connected as the power source of the above-described differential pair, and the drain and gate of the first transistor Tr1 can be reset to the power supply voltage VDD by driving the differential pair as described later.

In the first embodiment, a node VCR that also serves as the drain voltage of the second transistor Tr2 is connected to the gate of a NMOS transistor Tr3. The polarity of a node VCR (hereinafter referred to as "VCR polarity") is transmitted as one input of a NAND element N1 through a transistor Tr4 that receives a low power supply voltage VDDL (<VDD) to the gate.

A control signal CMP which is the other input of the NAND element N1 has a function as a control signal for switching whether or not to input the A/D conversion reference voltage Vramp to the gate of the second transistor Tr2 via a transistor Tr5. At the same time, the control signal CMP determines the output polarity of the NAND element N1 when the VCR polarity is Hi.

A node transmitting the VCR polarity can also be reset to GND (Lo) by a control signal INI. When the control signal INI becomes Lo, it is possible to apply positive feedback that makes this node Hi through transistors Tr6 and Tr7 that use the low power supply voltage VDDL. Thereby, even when a gate voltage Vb of the load MOS transistor Tvb for controlling the change of the VCR polarity is small, that is, when the current of the differential pair is low, the change of the VCR polarity can be transmitted quickly. Hereinafter, the transistors Tr4, Tr6, Tr7, and NAND element N1 are collectively referred to as a "positive feedback circuit".

The output of the NAND element N1 is also input to a clock terminal of a latch circuit Lat1 so that a counter value CNT output from a counter (not shown) when the output of the NAND element N1 changes from Hi to Lo appears at a Q terminal Latch of a latch circuit Lat1. In this way, A/D conversion is performed by comparing the voltage of the pixel with the reference voltage Vramp that changes in proportion to time by the differential pair, and recording the counter value CNT at the moment when the magnitude relationship is reversed. In the present embodiment, the moment when the magnitude relationship is reversed is referred to as "when A/D conversion is confirmed".

Here, as important features of constitution in the present invention, the following two will be presented. One is a capacitor C that holds the voltage of the second transistor Tr2, that is, the voltage of the reference voltage Vramp (threshold voltage). Another is that a control signal SHTR applied to the gate of a transistor Tr8 that controls writing to the capacitor C is an output of the NAND element N1, and is also input to a clock terminal of a latch circuit Lat1. As will be described later with reference to the timing chart shown in FIG. 4, these are used for holding the reference voltage Vramp (threshold voltage; hereinafter referred to as "light reference voltage") in the previously processed frame when A/D conversion is confirmed. The capacitor C is configured to be reset via the NOR element N2.

The latch circuit Lat2 that inputs a power save control signal Ppsave to the clock terminal stores the VCR polarity to which positive feedback is applied, and generates a power save signal psave (determination signal) that is also one of the output signals of the pixel. Transistors are controlled by this power save signal psave to save power in circuits related to positive feedback. Further, the wiring for inputting the counter value CNT to the latch circuit Lat1 is cut off by a switch SW, thereby the load of the low power supply voltage VDDL and the counter value CNT is reduced to save power. The operation related to this power saving will also be described with reference to a timing chart shown in FIG. 4 to be described later.

Driving Method of the Image Sensor

Next, the driving method of the image sensor 11 in the first embodiment will be described with reference to the timing chart of FIG. 4. The timing chart shown in FIG. 4 roughly shows a period of the first frame from time t400 to time t407 after activation of the image sensor 11 and a period of a second frame from time t407 to time t413.

In the period from time t400 to time t407, A/D conversion is performed in all the pixels 20. In the first embodiment, it is important to keep the light reference voltage as VS in the capacitor C during this period.

Further, in the period from time t407 to time t411 in the period of the second frame, whether or not the brightness of each pixel of the image of the second frame is brighter than the first frame, that is, whether the voltage of each pixel is lower than the light reference voltage VS is detected. In accordance with the detection result, power saving control is performed by performing A/D conversion only in selected pixels in a period from time t411 to time t413. Note that there are pixels that perform A/D conversion and pixels that do not perform A/D conversion in a period from time t411 to time t413 according to the detection results in a period from time t407 to time t411, and both pixels will be described later.

At time t400, the power save control signal Ppsave is set to Hi, and the power save signal psave is initialized to Lo in all the pixels.

From time t400 to time t401, a vertical synchronization signal VD is set to Lo, and the capacitor C is reset through the NOR element N2. At this time, since the control signal CMP is Lo, the control signal SHTR from the output terminal of the NAND element N1 is Hi. Furthermore, since the reference voltage Vramp is shut off from the gate of the second transistor Tr2 by the control signal CMP at this time, the gate of the second transistor Tr2 is reset to Lo via the transistor Tr8 that receives the control signal SHTR to the gate.

On the other hand, as the control signal POFG and the transfer control signal PTX are both Hi, the gate of the first transistor Tr1 is reset to the power supply voltage VDD together with the photoelectric converter PD. Thereby, the current of the load MOS transistor Tvb controlled by the voltage Vb flows through the first transistor Tr1 in the differential pair, and the VCR node becomes Hi. During this period, the low power supply voltage VDDL is OFF at all pixels 20 and the so-called positive feedback circuit is not functioning. Therefore, it does not matter if the control signal INI becomes Hi and one input node of the NAND element N1 becomes Lo.

At time t401, the vertical synchronization signal VD becomes Hi and the reset of the capacitor C is released, and the control signal CMP becomes Hi and the reference voltage Vramp is input to the gate of the second transistor Tr2. Here, the initial voltage of the reference voltage Vramp is set higher than a voltage (approximately equal to the power supply voltage VDD) immediately after releasing the reset of the photoelectric converter PD and the reset of voltage at the gate of the first transistor Tr1 by setting the OFG control signal POFG and the transfer control signal PTX to Lo. As a result, a current flows through the second transistor Tr2 in the differential pair, and the node VCR becomes Lo. Even if the control signal CMP becomes Hi, since one input node of the NAND element N1 is Lo because the control signal INI is Hi, the control signal SHTR from the output terminal maintains Hi. The accumulation in the photoelectric converter PD is started from the moment when the transfer control signal PTX is set to Lo at time t401. However, the timing for setting the transfer control signal PTX to Lo may be controlled between time t401 and time t402 so that the time until the transfer control signal PTX is set to Hi again from time t403 to time t404 is a desired accumulation period.

At time t402, the low power supply voltage VDDL is set to Hi at all pixels 20, and the control signal INI is set to Lo. As a result, the positive feedback circuit is turned on, and the VCR polarity that is Lo at time t401 is transmitted as the polarity of one input node of the NAND element N1. Therefore, the control signal SHTR from the output terminal of the NAND element N1 remains Hi.

From time t403 to time t404, transfer control signal PTX is set to Hi, and the signal charge accumulated in the photoelectric converter PD from time t401 to time t404 is transferred to the gate of the first transistor Tr1.

At time t405, the voltage change of the reference voltage Vramp is started and a counter CNT is enabled. The voltage change of the reference voltage Vramp is proportional to the elapsed time from time t405.

At time t406, when the gate voltage of the first transistor Tr1 corresponding to the signal charge of pixel 20 falls below the reference voltage Vramp, a current flows to the first transistor Tr1 side of the differential pair, and node VCR becomes Hi. Then, since both inputs of the NAND element N1 become Hi, the control signal SHTR becomes Lo from the output terminal of the NAND element N1. As a result, the counter value CNT corresponding to the elapsed time from the time t405 is latched in the latch circuit Lat1 and output to the terminal Latch, and the A/D conversion of the pixel 20 is completed. The control signal SHTR output from the output terminal of the NAND element N1 that controls this moment also determines a voltage sample hold time of the reference voltage Vramp to the capacitor C. In other words, since the reference voltage Vramp when A/D conversion is confirmed which is to be compared with the reference voltage Vramp is sampled and held in the capacitor C, the reference voltage Vramp corresponding to the light signal of the first frame is held in the capacitor C as the light reference voltage VS.

At time t407, the control signal CMP is set to Lo, so that the control signal SHTR that is the output of the NAND element N1 of all the pixels 20 is set to Hi. Then, the reference voltage Vramp is cut off from the gate of the second transistor Tr2, and instead, a voltage corresponding to the light reference voltage VS which is different from pixel to pixel and held in the capacitor C is input to the gate of the second transistor Tr2. Until time t408, the control signal POFG and the transfer control signal PTX are set to Hi, and the gate of first transistor Tr1 and the photoelectric converter PD are reset to the power supply voltage VDD.

Next, time t410 is set so that an accumulation period becomes the same as the time from time t401 to time t404, which is the accumulation period of the first frame, and the transfer control signal PTX is set to Hi from time t409 to time t410. By doing so, the voltage corresponding to the light reference voltage VS held in the capacitor C and the voltage corresponding to the signal charge (light signal) accumulated in the photoelectric converter PD during the accumulation period from time t408 to time t410 of the second frame are compared by the differential pair.

As a result of the comparison, in a case where the voltage corresponding to the light signal is smaller than the light reference voltage VS, that is, in a case where the second frame is brighter, the VCR polarity becomes Lo, and in a case where the voltage is equal to or higher than the light reference voltage VS, that is, in a case where the second frame is darker, the VCR polarity becomes Hi.

At time t410, power save control signal Ppsave is raised to Hi, and the VCR polarity of the differential pair is latched by a latch circuit Lat2. As a result, the VCR polarity latched by the latch circuit Lat2 becomes the power save signal psave during the second frame. When the power save signal psave is Hi, that is, when the second frame is darker, supply of the low power supply voltage VDDL to the positive feedback circuit and supply of the counter CNT to the pixel are stopped. This contributes to a reduction in power consumption of the pixels that are not subjected to A/D conversion that starts from time t411 in the second frame.

For example, in a surveillance camera using infrared illumination in a dark environment, a person or an object that reflects the infrared illumination is extracted in the angle of view, and subjected to A/D conversion, and pixels other than the extracted person or object that correspond to the background are not A/D-converted. In this manner, it is possible to lower power consumption. By using such a differential pair, the magnitude comparison with the light reference voltage VS can be performed very quickly even if a current of the load transistor Tvb controlled by the voltage Vb is small. This also contributes to lower power consumption.

Further, from time t410 to time t411, the vertical synchronization signal VD is set to Lo to make the output of the NOR element N2 to Hi, and the capacitor C is reset. However, the other input of the NOR element N2 is the power save signal psave, and it is Hi except for pixels that are brighter than the light reference voltage VS. For this reason, since the output of the NOR element N2 of the pixel not subjected to A/D conversion remains Lo, the light reference voltage VS of the first frame is maintained in the capacitor C.

The reference voltage Vramp is reset to the initial voltage at any time up to time t411 (here, time t409). Then, at time t411, the voltage change of the reference voltage Vramp is started in the same manner as at time t405, and A/D conversion for the second frame is performed for selected pixels until time t413. In order to perform A/D conversion, at time t411, the control signal CMP is set to Hi again, the reference voltage Vramp is input to the gate of the second transistor Tr2, and the counter CNT is enabled again. Here, as described above, since the power save signal psave of the pixel that is not subjected to A/D conversion is Hi, the wiring for inputting the counter value CNT to the latch circuit Lat1 is cut off since the switch SW is turned OFF, and A/D conversion is not performed. On the other hand, in the pixel in which the power save signal psave is Lo, the switch SW is turned on, and the counter value CNT is input to the latch circuit Lat1, so that A/D conversion is selectively performed.

Further, in the pixels subjected to A/D conversion in the second frame, the reference voltage Vramp at time t412 when the magnitude relationship of the differential pair is determined is held in the capacitor C that had been reset in advance, similarly to the A/D conversion of the first frame from time t405 to time t407. As a result, the voltage of the light signal in the third frame (not shown) can be compared with the light reference voltage VS in the second frame for the pixels that have undergone A/D conversion.

As described above, in the driving method according to the first embodiment, the process performed from time t400 to time t407 is performed once, and the process from time t407 to time t413 is performed a plurality of times.

Note that during a period from time t407 to time t413 when the voltage corresponding to the light signal of the second frame is compared with the light reference voltage VS held in the capacitor C and the A/D conversion is performed on the selected pixels, pixel values obtained by A/D converting the light signal of the first frame and the power save signal psave are transmitted from all the pixels to the image processing unit 13 via the DFE 27 and the output circuit 28 under control of the horizontal scanning circuit 24 and the vertical scanning circuit 23. Since the A/D conversion is performed selectively in the second and subsequent frames, data amount of pixel values will be small, but similarly to the pixel values obtained in the first frame period, the pixel values are transmitted to the image processing unit 13 together with the power save signal psave in the next frame period. Hereinafter, the power save signal psave of pixel 20 ($p, q$) of the Nth frame is represented as psaveN(p, q), and the pixel value is represented as SigN(p, q).

Image Reconstruction Processing

Subsequently, the image reconstruction processing using the pixel value SigN(p, q) and the power save signal psave(p, q) will be described.

Figure 4:
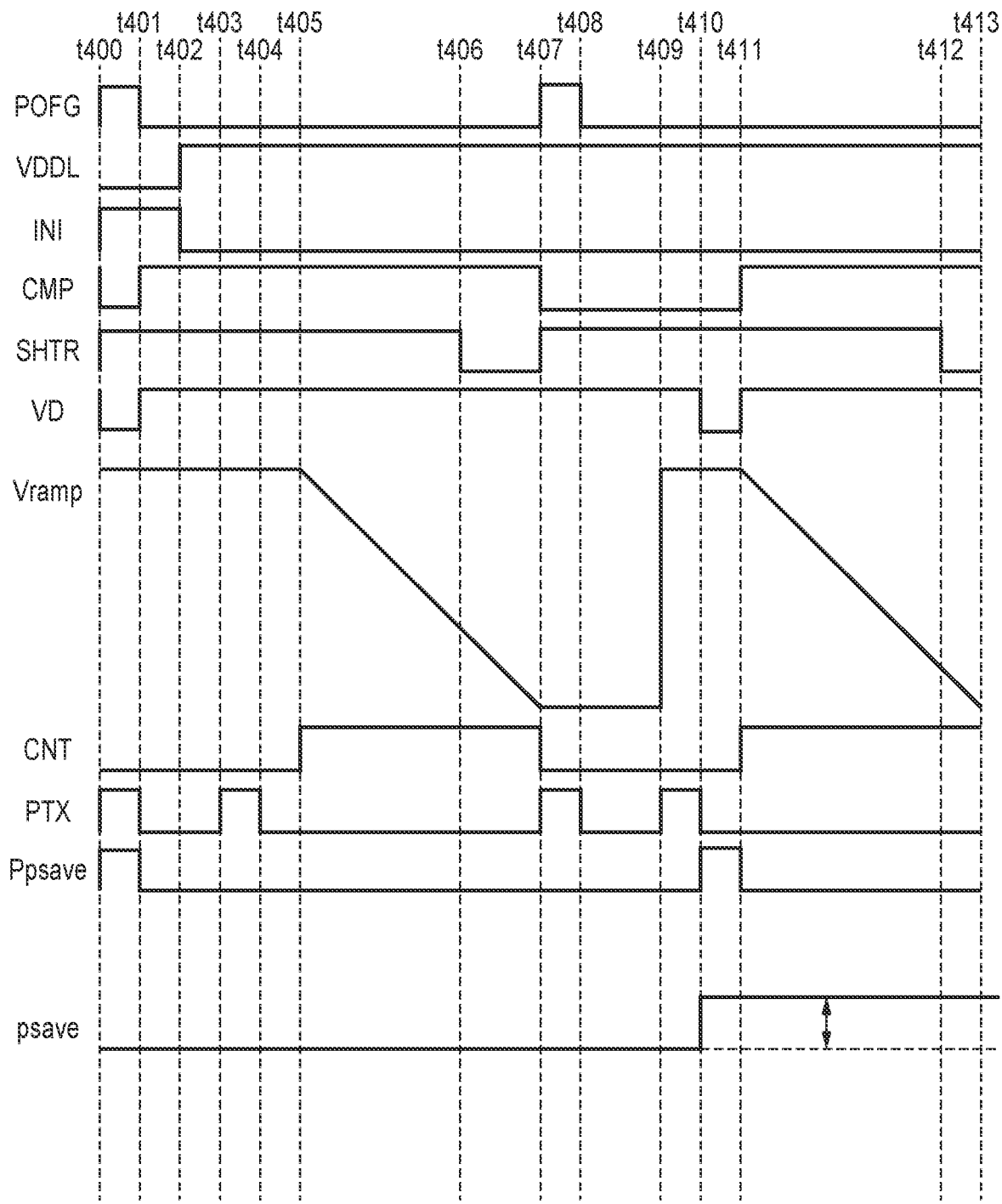
FIG. 4 is a timing chart illustrating a method for driving the image sensor according to the first embodiment.
Figure 5:
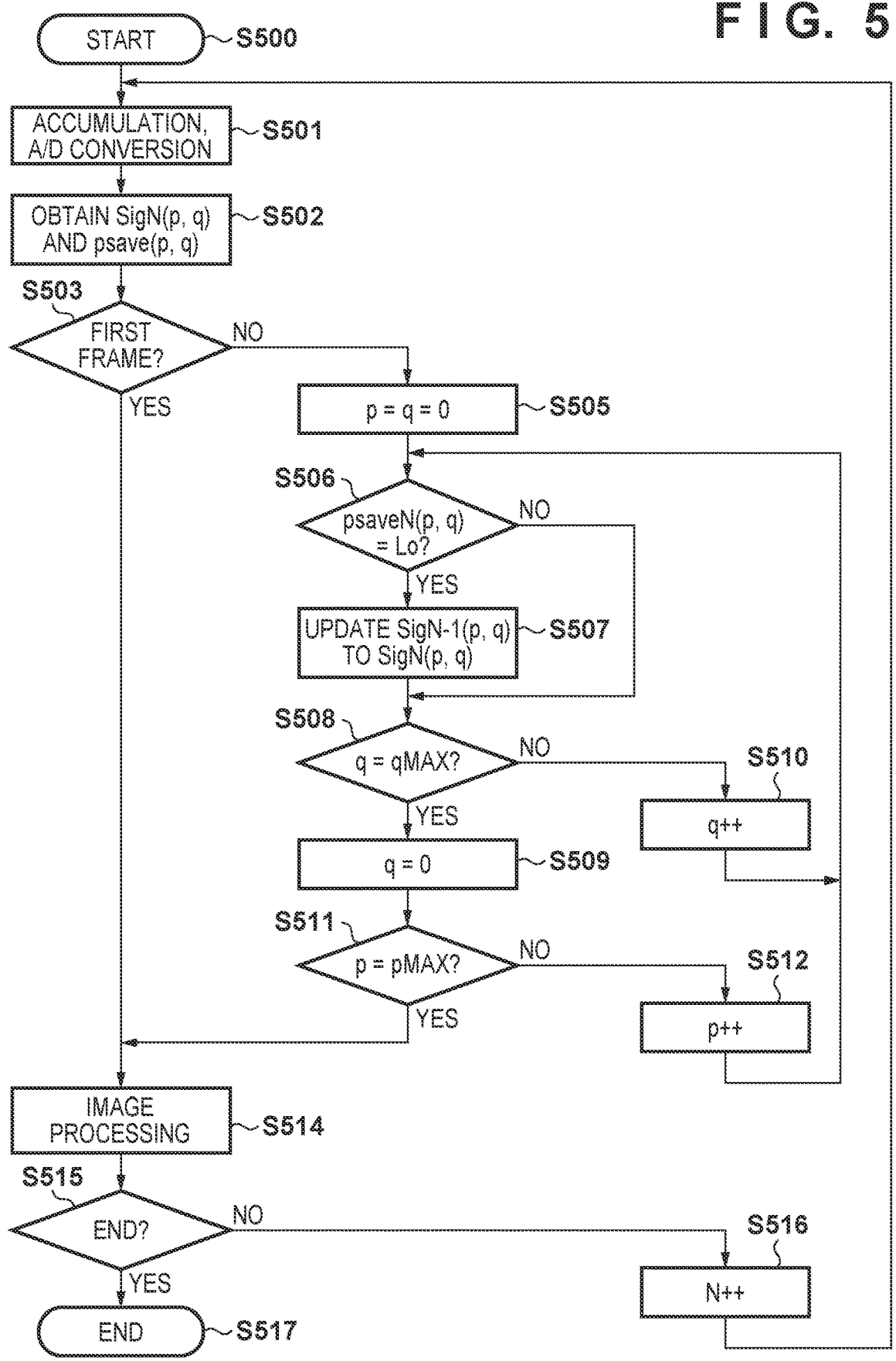
FIG. 5 is a flowchart illustrating processing of the image capturing apparatus according to the first embodiment.

FIG. 5 is a flowchart showing an example of processing in the image capturing apparatus of the first embodiment, and particularly shows image reconstruction processing in detail. When the processing is started in step S500, in step S501, charge accumulation and A/D conversion of the photoelectric converter PD corresponding to processes performed from time t400 to time t407 in the timing chart of FIG. 4 are performed in a case of the first frame. In the next step S502, the pixel value SigN(p, q) and the power save signal psaveN(p, q) are output to the image processing unit 13.

In step S503, the image processing unit 13 determines whether N=1, namely, the first frame or not. If the first frame, the process proceeds to step S514. If not, the process proceeds to the image reconstruction processing performed in steps S505 to S512. In this image reconstruction processing, processing based on the image one frame before is performed.

First, in step S505, the coordinates of the pixel to be processed are initialized to (0, 0). In step S506, the polarity of the power save signal psaveN(p, q) of pixel 20($p, q$) of the Nth frame is checked. If it is Lo, the process proceeds to step S507, and the pixel value of pixel 20 ($p, q$) of the Nth frame is set as a pixel value SigN(p, q). On the other hand, if the power save signal psaveN(p, q) is 1 (Hi), the pixel value is not updated, and the process proceeds to step S508 while keeping the pixel value SigN-1(p, q) of the (N-1) th frame.

In step S508, whether q representing the column coordinates is the maximum value qMAX is checked. If not, the process proceeds to step S510 to increment q, and the pixel value update processing in steps S506 and S507 is repeated. When q has reached qMAX, the process proceeds to step S509, where only q is initialized, and the process further proceeds to step S511.

In step S511, whether p representing the row coordinate is the maximum value pMAX is checked, and if not reached, the process proceeds to step S512 to increment p, and the pixel value update and increment of q in steps S506 to S510 are repeated. When p reaches pMAX, the image reconstruction processing is terminated, and the process proceeds to step S514.

In step S514, image processing is performed on an image of the first frame or on a reconstructed image of the second or subsequent frame.

In step S515, it is determined whether or not to end the image shooting. If not, the process proceeds to step S516, N is incremented, and the processing for the next frame is started in step S501. If the image shooting is to be ended, the process ends in step S517.

According to the first embodiment as described above, the light reference voltage of the previous frame and the voltage of the light signal of the current frame can be compared without delay by the differential pair provided for each pixel. Accordingly, it is possible to detect a change in luminance at high speed for each pixel while performing A/D conversion, and A/D conversion is performed only for the pixel value of a pixel which becomes brighter, thereby reducing power consumption during A/D conversion. Further, by determining the necessity of A/D conversion of the next frame using a differential pair used for A/D conversion for each pixel, it becomes possible to detect the movement of a small subject within the angle of view, and the operation for this detection can also be performed with a small current.

It should be note that the positive feedback circuit at the time of this determination is not necessarily required. The positive feedback circuit is a circuit necessary to quickly compare the voltages at the gate of the first transistor Tr1 and at the gate of the second transistor Tr2 when A/D conversion is confirmed. Therefore, if an offset voltage can be applied to the capacitor C that connects to the second transistor Tr2, the A/D conversion target pixel can be determined beyond such fluctuations of the differential pair, and therefore the positive feedback circuit can be omitted.

Further, the drain node of the first transistor Tr1 may be connected to a positive feedback circuit, or the configuration may be arranged such that the inversion polarity of the node VCR is transmitted so that a darkened pixel can be A/D-converted.

Second Embodiment

Next, a second embodiment of the present invention will be described.

Figure 6:
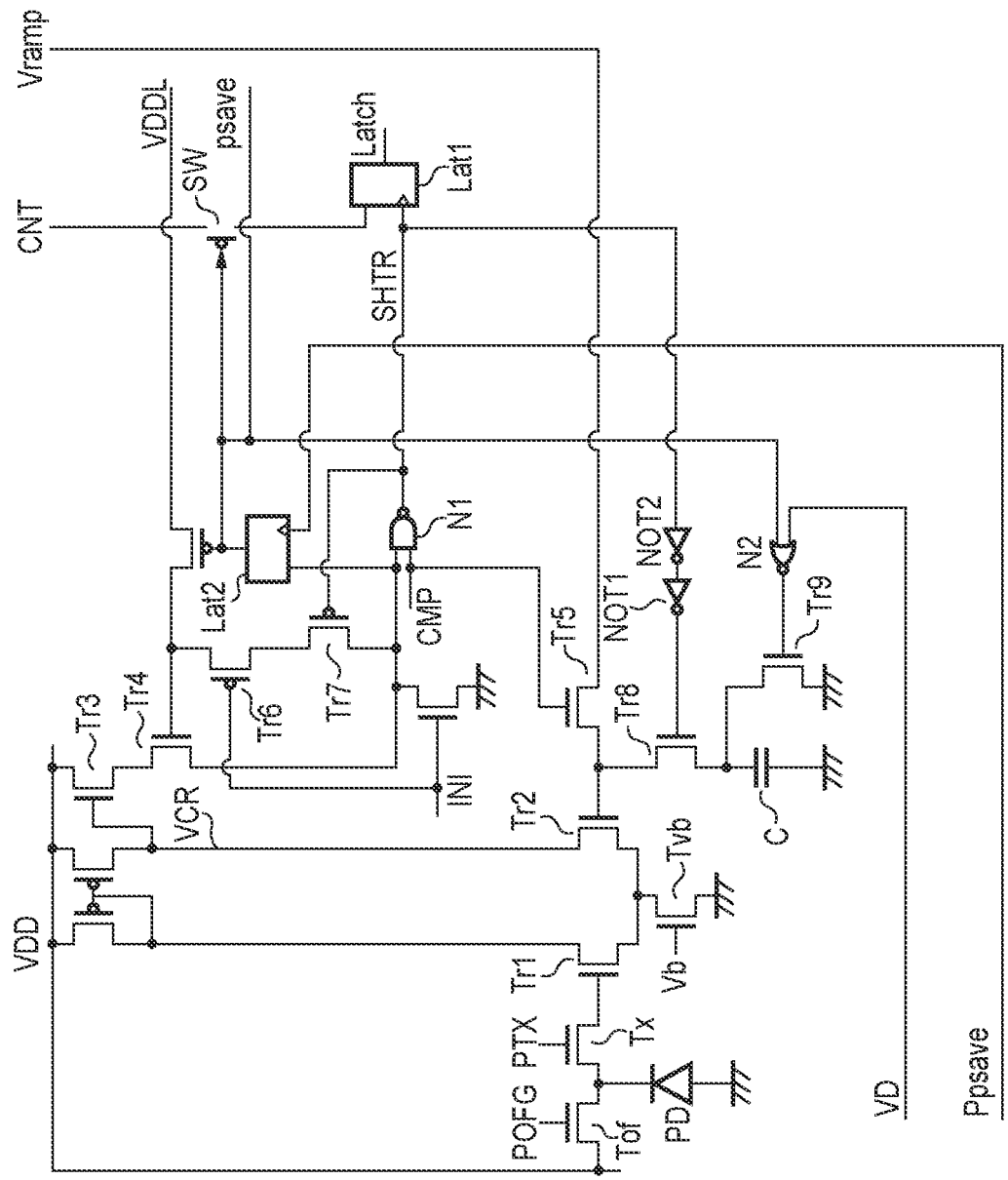
FIG. 6 is an equivalent circuit diagram illustrating a configuration of each pixel of the image sensor according to a second embodiment.

FIG. 6 is an equivalent circuit diagram showing an example of the configuration of the pixel 20 of the image sensor 11 in the second embodiment. The difference between the configurations shown in FIG. 6 and shown in FIG. 3 in the first embodiment is that two inverter elements NOT1 and NOT2 are connected in series before the control signal SHTR is input to the gate of the transistor Tr8 to form a delay circuit. Note that the two inverter elements connected in series are merely example, and an even number of the inversion elements may be connected in series.

As a result, the input to the inverter element NOT2 and the output of the inverter element NOT1, that is, the control signal SHTR, have the same polarity, but the control signal SHTR occurs at a timing later than when A/D conversion is confirmed in the latch circuit Lat1. Therefore, the capacitor C holds a voltage lower than the reference voltage Vramp when A/D conversion is confirmed, that is, a slightly brighter voltage VS'. Therefore, in a case where a result of the bright/dark comparison between the optical signals of the current frame and of the next frame performed from time t409 to time t411 in the timing chart of FIG. 4 indicates that the optical signal of the next frame is brighter than the voltage VS' which is brighter than the light reference voltage VS, the power save signal psave becomes Lo. As a result, A/D conversion is performed only on pixels that became brighter beyond the influence of noise or the like.

According to the second embodiment as described above, since the reference voltage Vramp is sampled and held in the capacitor C with a delay from when A/D conversion is confirmed for each pixel, it is possible to perform A/D conversion on the pixels in the next frame that became brighter beyond the influence of noise or the like. Thereby, the electric power concerning A/D conversion can be reduced in more pixels.

Third Embodiment

Next, a third embodiment of the present invention will be described.

Figure 7:
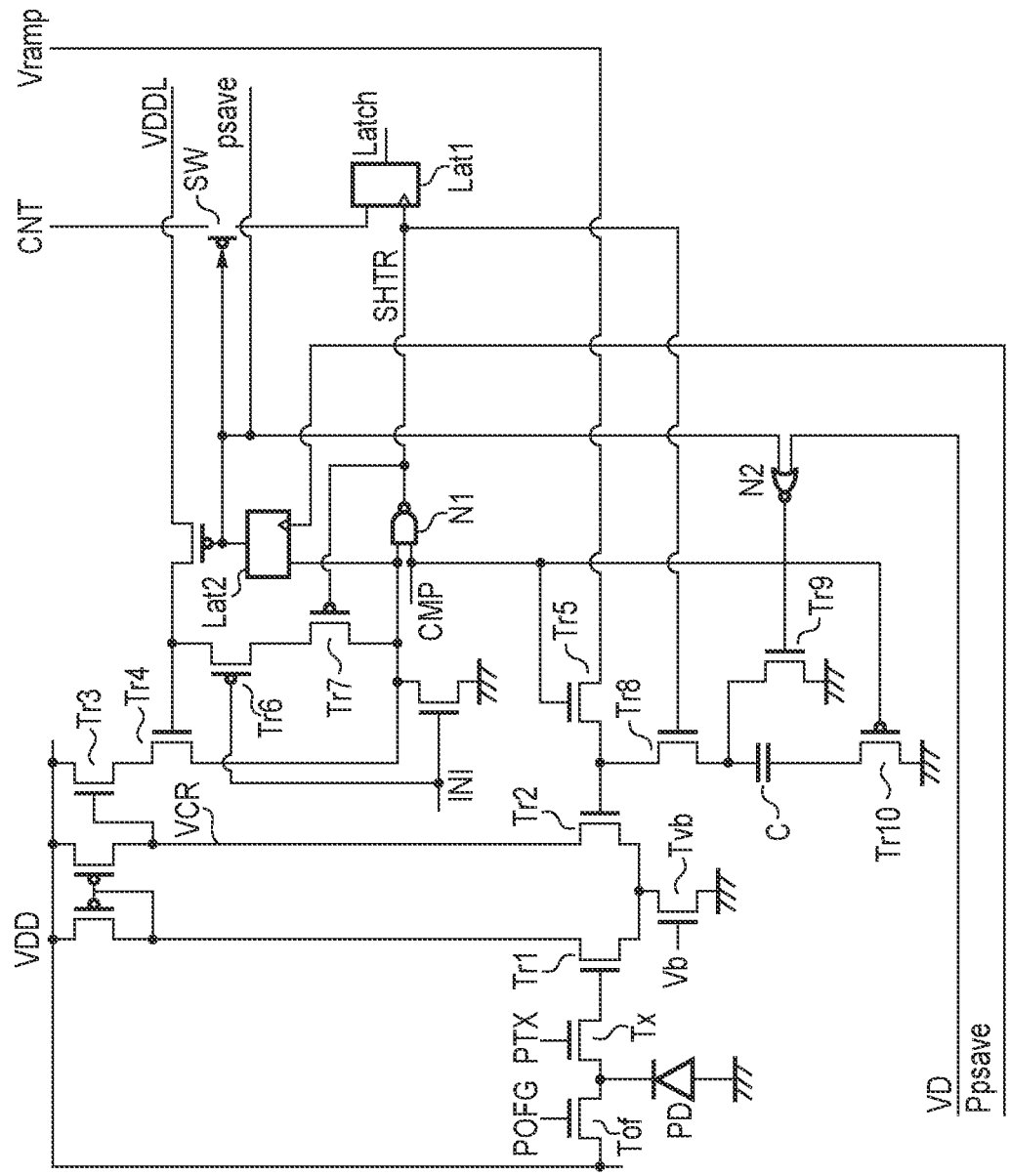
FIG. 7 is an equivalent circuit diagram illustrating a configuration of each pixel of the image sensor according to a third embodiment.

FIG. 7 is an equivalent circuit diagram showing an example of the configuration of the pixel 20 of the image sensor 11 in the third embodiment. The difference between the configurations shown in FIG. 7 and shown in FIG. 3 in the first embodiment is that it is configured such that a voltage Vc can be input to one terminal of the capacitor C through a transistor Tr10 that receives the control signal CMP at its gate.

When the control signal CMP is Lo as shown in the timing chart of FIG. 4 from time t407 to time t411, the transistor Tr10 is turned on. Together with the control signal SHRT being Hi, the sum of the light reference voltage VS and the voltage Vc held in the capacitor C can be input to the gate of the second transistor Tr2. As a result, if the voltage Vc is a negative voltage, the power save signal psave becomes Lo when it is brighter than the light reference voltage VS beyond the magnitude of the voltage Vc, and only pixels that became brighter beyond the influence of noise or the like can be A/D-converted.

According to the third embodiment as described above, since the offset voltage Vc can be added to the voltage sampled and held in the capacitor C, only the pixels in the next frame that became brighter beyond the influence of noise or the like are A/D-converted. As a result, the power required for A/D conversion can be reduced in more pixels.

Note that by using a positive voltage as the voltage Vc, it may be possible to A/D-convert a large number of pixels that became brighter. Further, the voltage Vc may be changed according to photographing conditions such as ISO sensitivity, gain, and accumulation time.

Fourth Embodiment

Next, a fourth embodiment of the present invention will be described.

Figure 8:
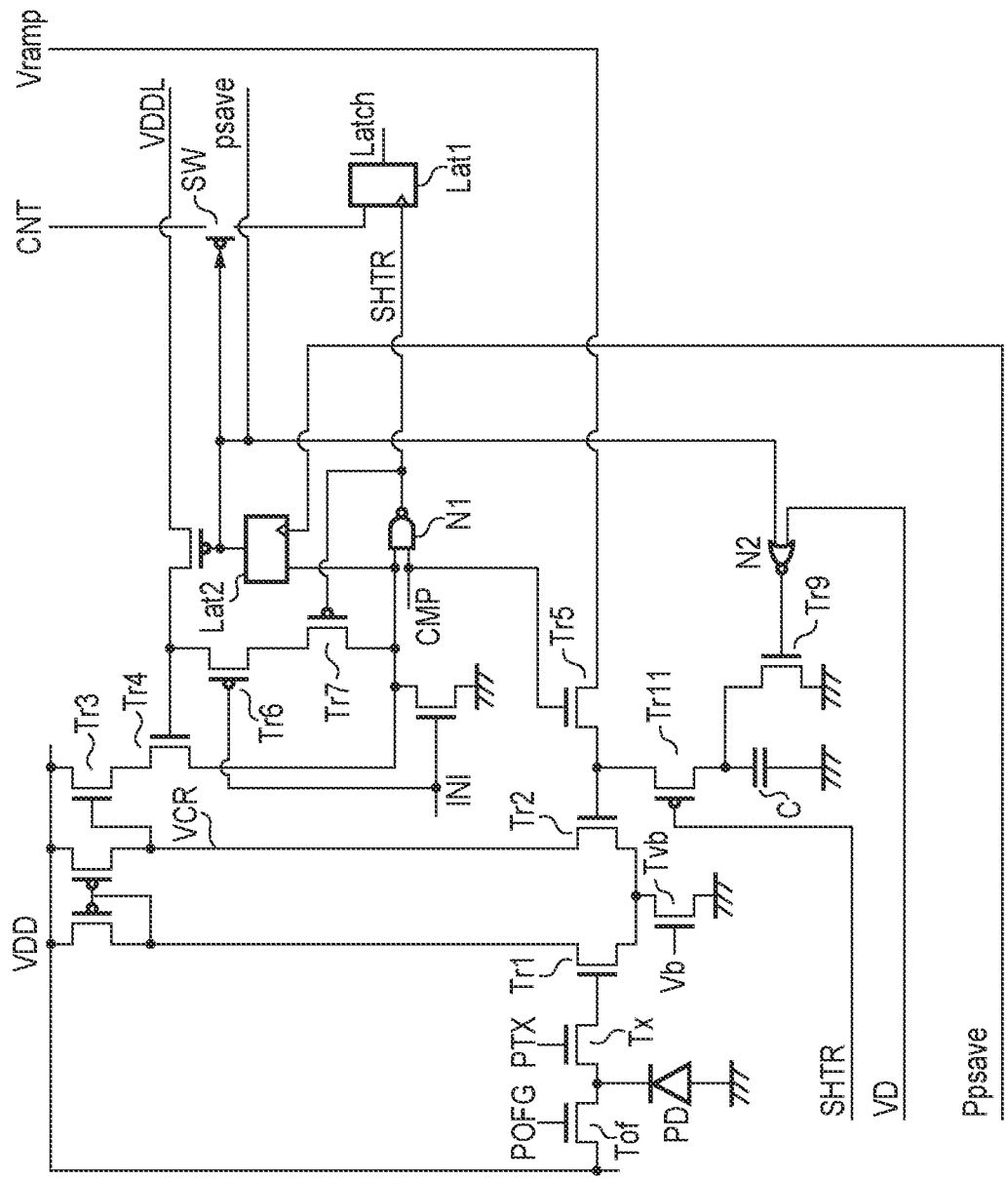
FIG. 8 is an equivalent circuit diagram illustrating a configuration of each pixel of the image sensor according to a fourth embodiment.

FIG. 8 is an equivalent circuit diagram showing an example of the configuration of the pixel 20 of the image sensor 11 in the fourth embodiment. The difference between the configurations shown in FIG. 8 and shown in FIG. 3 in the first embodiment is that the control signal SHTR to the capacitor C is independently controlled. Then, as shown in a timing chart shown in FIG. 9 to be described later, the light reference voltage VS is held in the capacitor C via a transistor Tr11 as Lo when the differential pair is settled.

Figure 9:
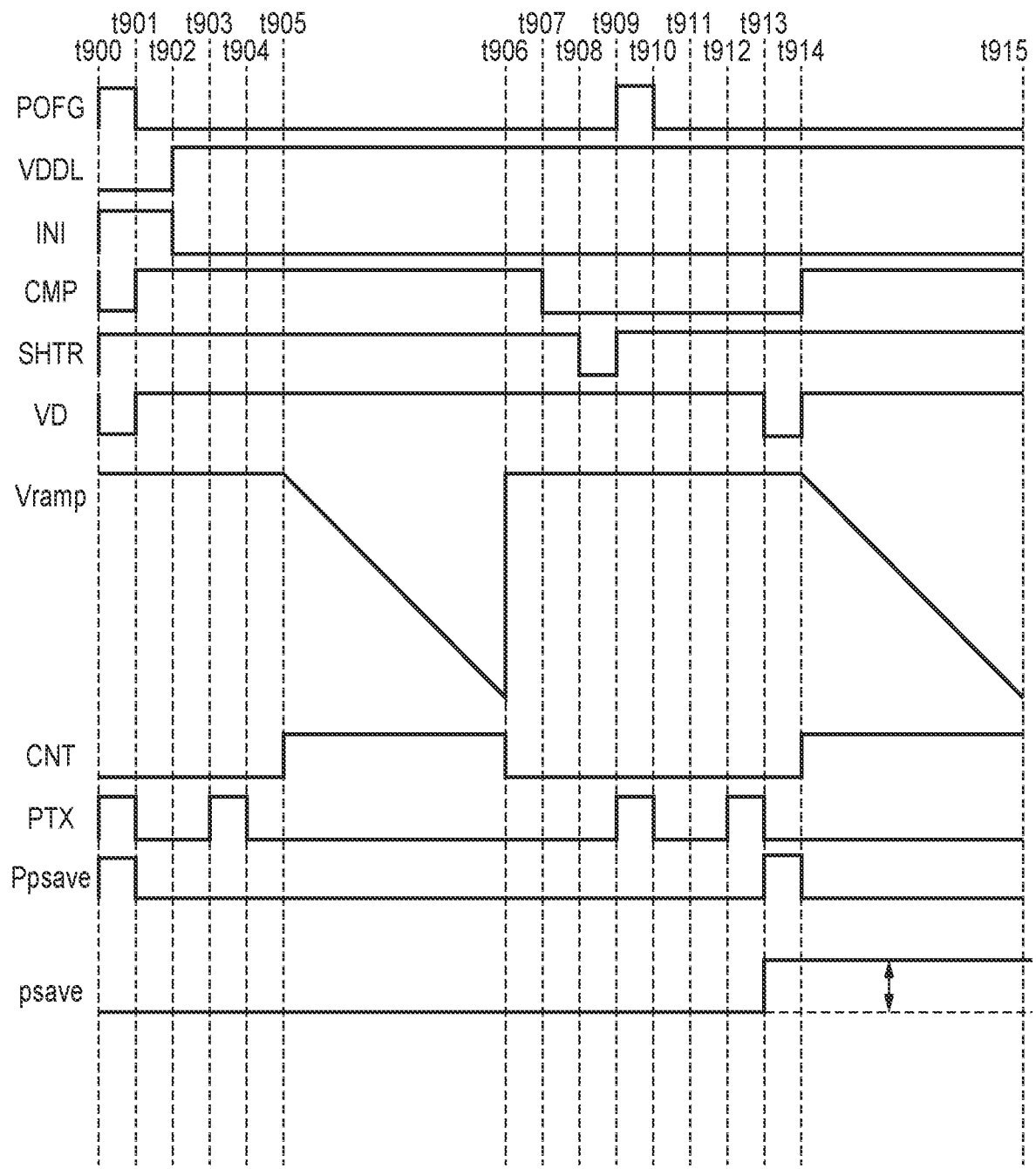
FIG. 9 is a timing chart illustrating a method for driving the image sensor according to the fourth embodiment.

FIG. 9 is a timing chart showing a method for driving the image sensor 11 according to the fourth embodiment. In FIG. 9, the processes from time t900 to t905 is the same as the processes shown in FIG. 4, and description thereof is omitted. The difference between FIG. 9 and FIG. 4 described in the first embodiment is that the light reference voltage SV is not held in the capacitor C at time t906 when the A/D conversion is confirmed, but held in accordance with a change of the control signal SHTR to Lo between the newly added period between time t907 and time t909. The period from time t909 to t915 for determining the A/D conversion target pixel and the A/D conversion period for the next frame are the same as the time t407 to t413 in the timing chart of FIG. 4 except for the timing to reset the reference voltage Vramp to the initial voltage. Therefore, the description is omitted.

At time t906, the reference voltage Vramp is reset to an initial voltage higher than the power supply voltage VDD. Thereby, in all the pixels 20, the current of the differential pair once flows through the second transistor Tr2 side, and the drain voltage of the first transistor Tr1 side rises to substantially the power supply voltage VDD. In this state, when the control signal CMP is set to Lo at time t907, the reference voltage Vramp is cut off from the gate of the second transistor Tr2, and the second transistor Tr2 side of the differential pair enters a floating state. As a result, the differential pair temporarily outputs the voltage of the light signal of each pixel gathered as the gate voltage of the first transistor Tr1 to the common source node of the differential pair through a source follower circuit to which an approximately power supply voltage VDD is applied. By waiting for stabilization of the differential pair, the gate voltage of the floating second transistor Tr2 converges to the gate voltage of the first transistor Tr1.

Thereafter, at time t908, the control signal SHTR is set to Lo, and the gate voltage of the second transistor Tr2 that has been stabilized as described above is held in the capacitor C as the light reference voltage VS.

In this way, it is necessary to wait for the time for stabilization, but the light reference voltage VS for each pixel can be held in the capacitor C by the control signal from the TG 22 without using the information of when A/D conversion is confirmed. This can be realized with a simpler circuit.

Fifth Embodiment

Next, a fifth embodiment of the present invention will be described. In the fifth embodiment, control is performed so that not only pixels that became brighter but also pixels that became darker beyond a predetermined range are subject to A/D conversion.

Figure 10:
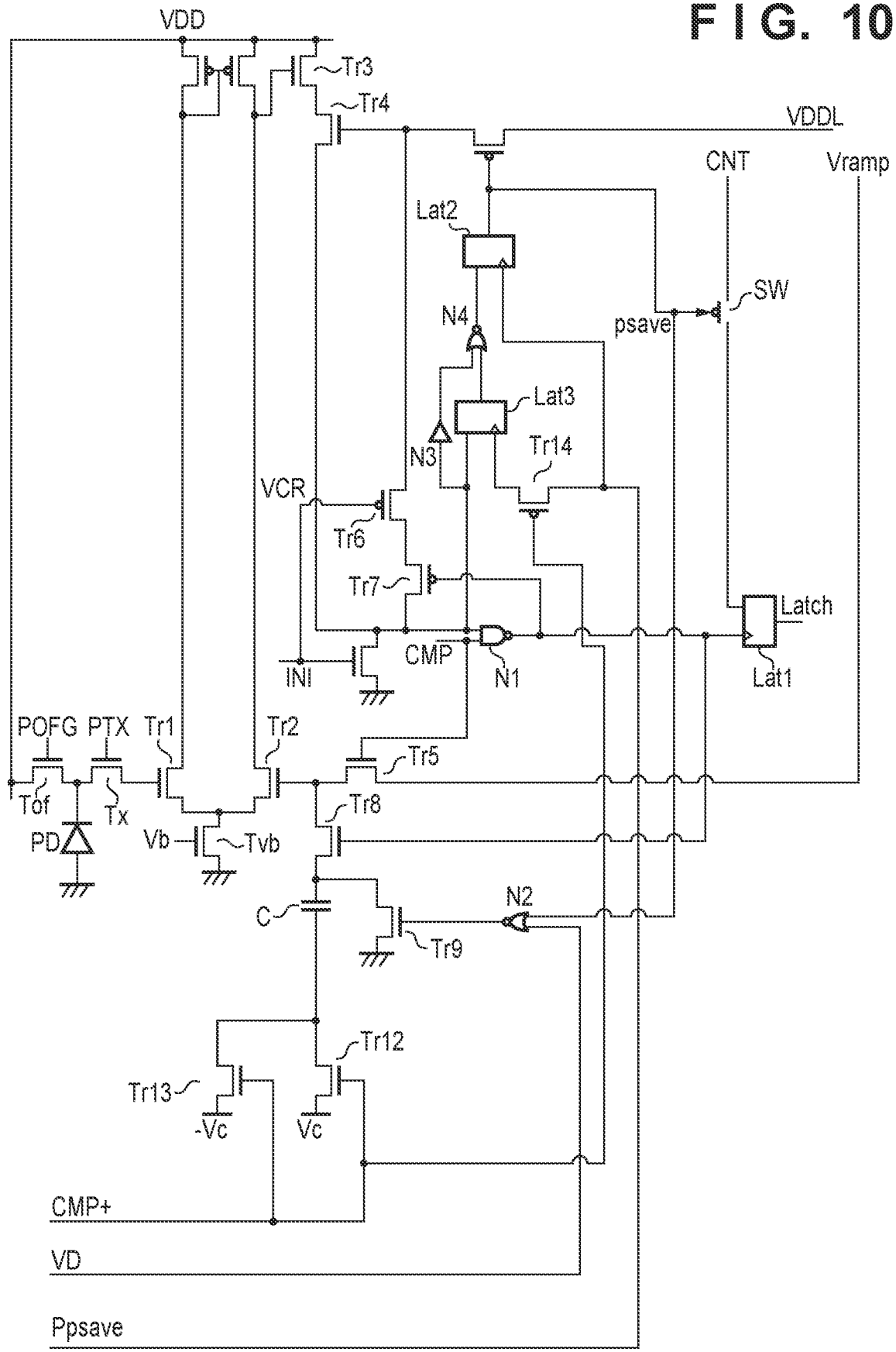
FIG. 10 is an equivalent circuit diagram illustrating a configuration of each pixel of the image sensor according to a fifth embodiment.

FIG. 10 is an equivalent circuit diagram illustrating an example of the configuration of the pixel 20 of the image sensor 11 according to the fifth embodiment. The difference from FIG. 3 described in the first embodiment is that the voltage Vc and a voltage−Vc can be selectively input to one terminal of the capacitor C through transistors that receives a new control signal CMP+ at their gate. Given that the control signal SHTR is Hi as shown in the timing chart of FIG. 4, from time t407 to time t411, the sum of the light reference voltage VS and the voltage Vc or −Vc held in the capacitor C is applied to the gate of the second transistor Tr2. The point that an offset can be given when detecting A/D conversion target pixels is the same as in the third embodiment, but how the brightness changing range from the light reference voltage VS is determined using this offset will be described later with reference to the timing chart shown in FIG. 11.

Further, a latch circuit Lat+ is newly provided so that the VCR polarity can be latched when the control signal CMP+ is changed to Lo and the power save control signal Ppsave is changed to Hi. Furthermore, an inverter element N3 and a NOR element N4 are provided, and the negative logical sum of the latched VCR polarity and the inversion polarity of the VCR node when the control signal CMP+ is Hi and the power save control signal Ppsave changes to Hi is stored and made effective as the power save signal psave.

Figure 11:
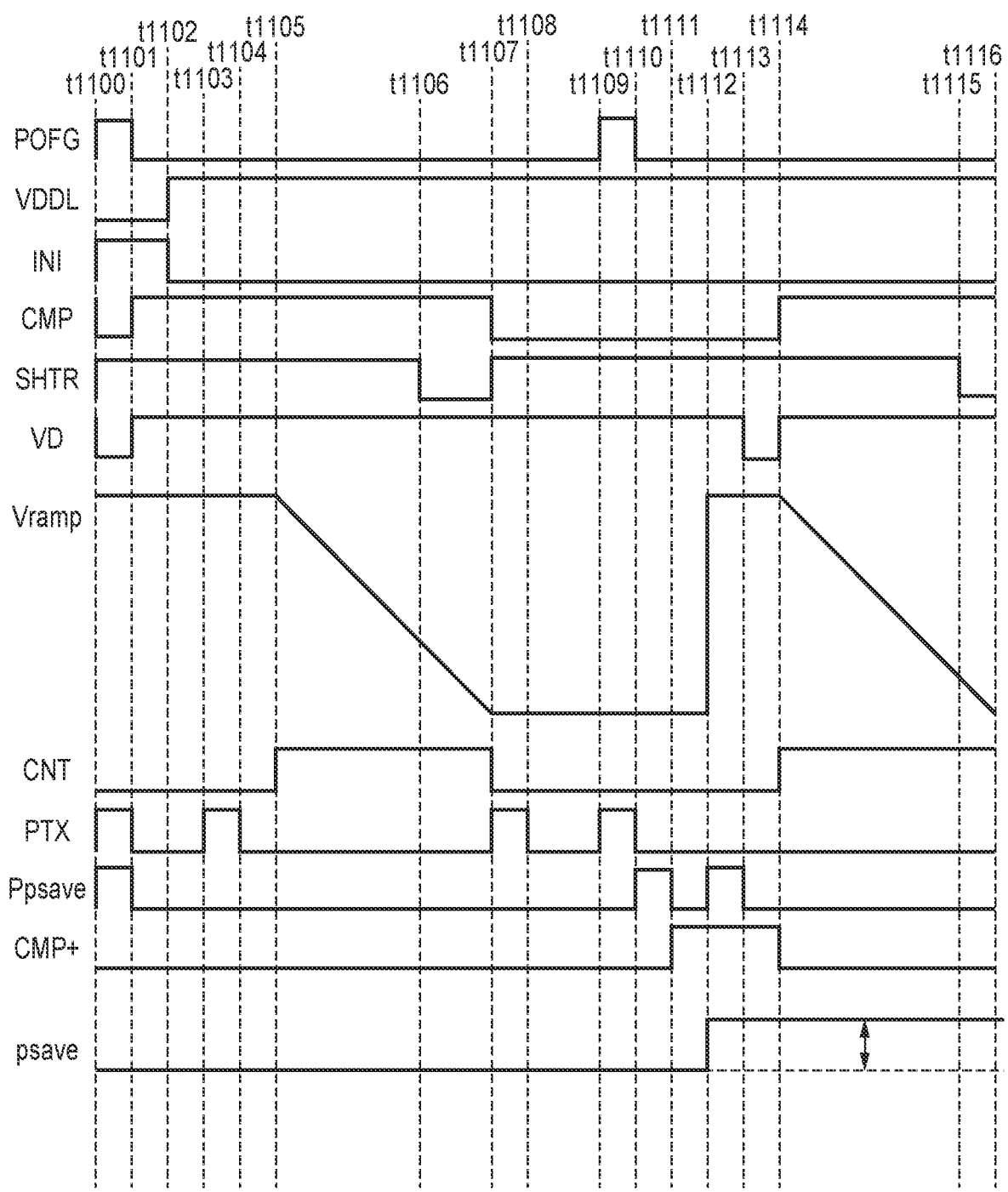
FIG. 11 is a timing chart illustrating a method for driving the image sensor according to the fifth embodiment.

FIG. 11 is a timing chart showing a driving method of the image sensor 11 in the fifth embodiment. The difference between FIG. 11 and FIG. 4 described in the first embodiment is that the control signal CMP+ is newly added and the polarity of the control signal CMP+ is changed from Lo to Hi at time t1111 while the A/D conversion target pixels are determined in a period from time t1110 to time t1114. Also, the polarity of the power save control signal Ppsave is changed twice from Lo to Hi.

It is stored in the latch circuit Lat+ whether or not a pixel had become brighter than the light reference voltage VS plus the voltage Vc in response to a change in polarity of the power save control signal Ppsave from Lo to Hi at the time t1110 while the control signal CMP+ is Lo. When the pixel becomes brighter, the polarity is Lo, and when it becomes darker, the polarity is Hi. After the control signal CMP+ is set to Hi at time t1111, whether or not the pixel had become brighter than the light reference voltage VS plus voltage−Vc appears as the polarity of the VCR node. When the pixel becomes brighter, the polarity is Lo, and when it becomes darker, the polarity is Hi. The appeared polarity is inverted and the negative logical sum of the inverted polarity and the previously latched polarity in the latch circuit Latch+ is taken by the NOR element, and the negative logical sum is latched as the power save signal psave in response to the power save control signal Ppsave signal changing from Lo to Hi at time t1112. Thus, the power save signal psave becomes Hi when the change in brightness is within a±Vc range around the light reference voltage VS, and becomes Lo when it is outside of the ±Vc range.

As a result, it is possible to set the pixels subjected to the A/D conversion performed from time t1114 in the second and subsequent frames to the pixels whose brightness has changed by +Vc or more.

Sixth Embodiment

Next, a sixth embodiment of the present invention will be described.

In the sixth embodiment, when the power save signal psaveN(n) of a certain pixel 20(p, q) is Lo, Δn (number of consecutive) of the power save signal psaveN(n+Δn) that becomes Lo next is transmitted with the pixel value SigN(n). This reduces an amount of data for image reconstruction processing performed in the image processing unit 13 of the image capturing apparatus.

Figure 12:
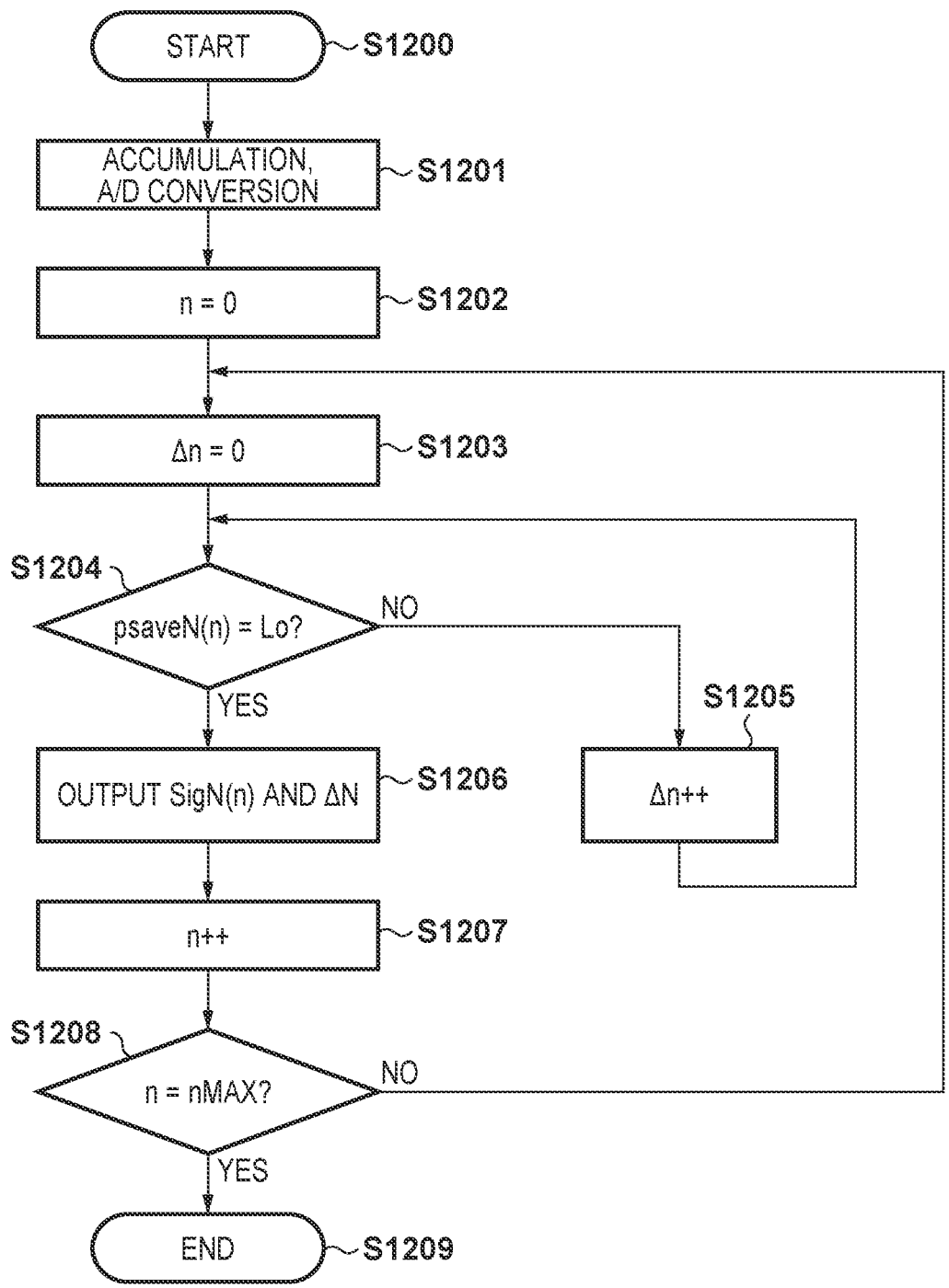
FIG. 12 is a flowchart illustrating processing of an image sensor according to a sixth embodiment.

FIG. 12 is a flowchart showing a driving method of the image sensor 11 in the sixth embodiment, and particularly shows control of data processing performed in the DFE 27.

In step S1200, the processing is started. When the accumulation of the image sensor 11 and the A/D conversion are completed in step S1201, the pixel position of (p, q) is set to n and is initialized to n=0 in step S1202. In step S1203, Δn is also initialized to 0.

Next, in step S1204, it is confirmed whether or not power save signal psaveN(n) is Lo. If Hi, the process proceeds to step S1205, Δn is incremented, and the process returns to step S1204. If it is Lo, the pixel is an A/D conversion target pixel, and the process proceeds to step S1206 to transmit the pixel value SigN(n) and Δn incremented so far. In step S1207, n is incremented, and unless nMAX=pMAX×the number of horizontal pixels+qMAX, n representing the last pixel, is reached in step S1208, the process returns to step S1203, and the polarity of the next power save signal psaveN(n) is checked.

Thus, the DFE 27 of the image sensor does not transmit the pixel value SigN(n) of the pixel with the power save signal psaveN (n)=Hi to the image processing unit 13 of the image capturing apparatus, thereby power consumption of the output circuit 28 can be reduced.

Figure 13:
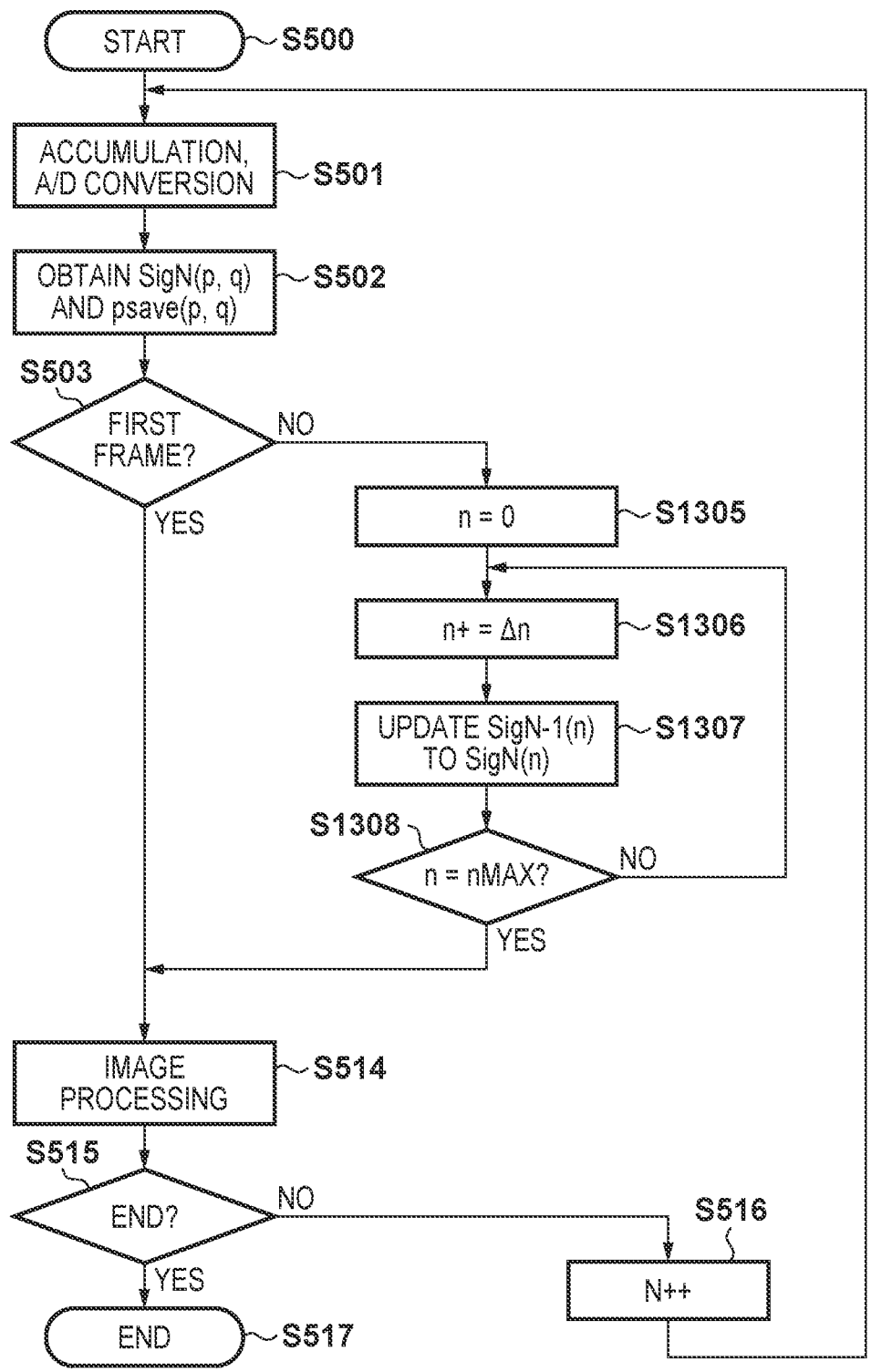
FIG. 13 is a flowchart illustrating a method for controlling an image processing unit according to the sixth embodiment.

Next, the image reconstruction processing performed by the image processing unit 13 upon receiving such data transmission will be described. FIG. 13 is a flowchart showing processing in the image capturing apparatus in the sixth embodiment, and particularly shows the image reconstruction processing in detail. Note that the same step numbers are given to the processes similar to those in the flowchart shown in FIG. 5, and description thereof is omitted. Also in this image reconstruction processing, processing based on the image one frame before is performed.

If it is determined in step S503 that the frame is not the first frame, the process proceeds to step S1305 and n indicating the pixel position is initialized to 0. In step S1306, the coordinate n is incremented by Δn to move to a coordinate at which the pixel value needs to be updated, and in step S1307, the pixel value of pixel 20(n) in the Nth frame is updated to the pixel value SigN(n).

In step S1308, the process returns to step S1306 and the pixel value update process is repeated until the pixel position n reaches nMAX.

According to the sixth embodiment as described above, pixel information transferred from the image sensor 11 to the image processing unit 13 can be reduced, and the image reconstruction processing in the image processing unit 13 can be simplified.

Seventh Embodiment

Next, a seventh embodiment of the present invention will be described. In the seventh embodiment, by transmitting the image signal SigN(p, q) which is multiplied by the power save signal psave, the amount of data to be transmitted is reduced by the amount corresponding to the power save signal, thereby reducing the power consumption of the output circuit 28 similarly to the sixth embodiment.

Figure 14:
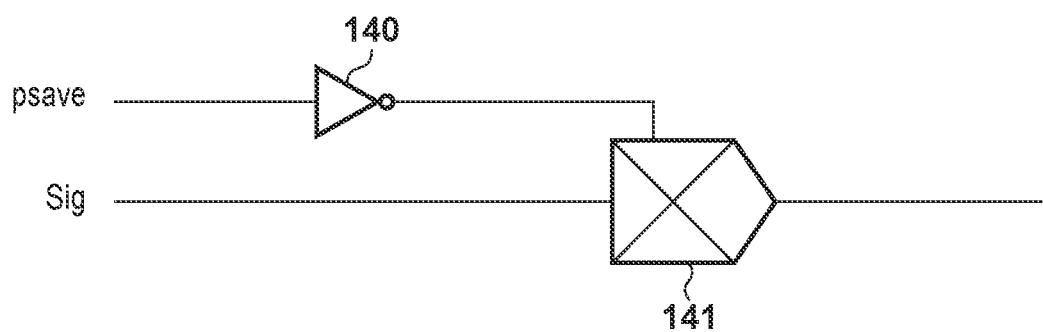
FIG. 14 is a block diagram illustrating a configuration of a DFE unit of an image sensor according to a seventh embodiment.

FIG. 14 is a block diagram illustrating an example of the configuration of the DFE 27 of the image sensor 11 according to the seventh embodiment. The power save signal psaveN(p, q) that becomes Lo in an A/D conversion target pixel, namely, pixel 20 whose pixel value needs to be updated, is subjected to bitwise multiplication by the multiplier 141 through an inverter element 140 with the pixel value SigN(p Q). As a result, the pixel value of the pixel that does not need to be updated becomes zero. The output terminal of the multiplier 141 is connected to the output circuit 28, for example. Therefore, the pixel value Sig necessary for updating the pixel value can be sent to the image processing unit 13 of the image capturing apparatus while reducing the amount of data to be transmitted by an amount of the power save signal psave.

In the image processing unit 13, although the image reconstruction processing is performed according to the flow in FIG. 5 of the first embodiment, instead of confirming the polarity of the power save signal psaveN(p, q) in step S506, whether or not the pixel value SigN(p, Q) is 0 may be checked. If it is not 0, the pixel value may be updated as in step S507.

In addition to this, the reconfiguration processing method can also be performed as follows. That is, the power save signal psaveN (p, q) is transmitted, and the product of the image signal SigN-1(p, q) of the (N-1)th frame and the polarity-inverted power save signal psaveN(p, q) is obtained by similar multiplication performed in the DFE 27 of this embodiment. Then, by taking the sum of the obtained pixel value SigN-1(p, g) and the pixel value SigN (p, g), an Nth frame image is formed. This image reconstruction processing may be performed by the DFE 27 of the image sensor.

In any of the above embodiments, the image sensor of the present invention can be made by forming the substrate including the photoelectric conversion unit and the substrate including the positive feedback circuit, the reference voltage generation unit, the latch circuit, the TG22, the vertical scanning circuit 23, and the horizontal scanning circuit 24 by separate semiconductor processes, then stacking and connecting those substrate. However, the circuit configuration of each substrate is not limited to this, and the substrate including the photoelectric conversion unit may be formed as a so-called back-illuminated type, and the positive feedback circuit and a part of the differential pair described above may be arranged on the front surface side of the substrate. In addition, in the case where a latch circuit for latching a signal of each pixel is arranged on a substrate different from the substrate including the photoelectric conversion unit, it is preferable to stack and connect the substrates through a substrate connection unit for each pixel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-018258, filed on Feb. 4, 2019 which is hereby incorporated by reference herein in its entirety.

What is claimed is:

1. An image sensor having a plurality of pixels each of which comprising:
   a photoelectric converter that repeatedly generates charge corresponding to an amount of incident light;
   an A/D converter that A/D converts a voltage corresponding to the charge generated by the photoelectric converter into a digital signal by comparing the voltage with a reference voltage that changes with a lapse of time;
   a capacitor that holds a threshold voltage based on the voltage corresponding to the charge; and
   a switching circuit that switches whether to perform A/D conversion on a voltage that corresponds to newly generated charge by the photoelectric converter based on a comparison result between the voltage that corresponds to the newly generated charge and the threshold voltage held in the capacitor.

2. The image sensor according to claim 1, wherein the capacitor holds the reference voltage at a time when the voltage corresponding to the charge is changed to the digital signal in the A/D converter as the threshold voltage.

3. The image sensor according to claim 2, wherein the switching circuit switches not to perform the A/D conversion in a case where the comparison result indicates that an amount of light corresponding to the voltage that corresponds to the newly generated charge is smaller than an amount of light corresponding to the threshold voltage.

4. The image sensor according to claim 1, wherein the capacitor holds the voltage corresponding to the charge generated by the photoelectric converter as the threshold voltage.

5. The image sensor according to claim 4, wherein the switching circuit switches not to perform the A/D conversion in a case where the comparison result indicates that an amount of light corresponding to the voltage that corresponds to the newly generated charge is smaller than an amount of light corresponding to the threshold voltage.

6. The image sensor according to claim 1, wherein the capacitor holds the reference voltage at a time after a predetermined delay period since the voltage corresponding to the charge is converted into the digital signal in the A/D converter as the threshold voltage.

7. The image sensor according to claim 6, wherein the switching circuit switches not to perform the A/D conversion in a case where the comparison result indicates that an amount of light corresponding to the voltage that corresponds to the newly generated charge is smaller than an amount of light corresponding to the threshold voltage.

8. The image sensor according to claim 1, wherein the switching circuit compares the voltage that corresponds to the newly generated charge with a voltage obtained by adding an offset voltage to the threshold voltage, and switches not to perform the A/D conversion in a case where a comparison result indicates that an amount of light corresponding to the voltage that corresponds to the newly generated charge is smaller than the voltage obtained by adding the offset voltage to the threshold voltage.

9. The image sensor according to claim 1, wherein the switching circuit compares the voltage that corresponds to the newly generated charge with a predetermined range of voltage with respect to the threshold voltage, and switches not to perform the A/D conversion in a case where a comparison result indicates that the voltage that corresponds to the newly generated charge is not within the predetermined range.

10. The image sensor according to claim 1, further comprising an output circuit that outputs image data that includes a pixel value obtained by the A/D conversion in a case where the A/D conversion is performed by the A/D converter.

11. The image sensor according to claim 10, wherein the image data includes a determination signal indicative of whether or not the A/D conversion is performed.

12. The image sensor according to claim 10, wherein the output circuit counts a consecutive number of pixels which are not A/D-converted by the A/D converter, and the image data further includes the consecutive number of pixels which are not A/D-converted.

13. The image sensor according to claim 10, wherein the output circuit outputs 0 as the pixel value of a pixel which is not A/D-converted by the A/D converter.

14. The image sensor according to claim 1, wherein the image sensor is configured by stacking
   a first substrate on which the photoelectric converters are formed, and
   a second substrate on which at least the A/D converters are formed.

15. An image capturing apparatus comprising:
   an image sensor having a plurality of pixels each of which comprising
      a photoelectric converter that repeatedly generates charge corresponding to an amount of incident light,
      an A/D converter that A/D converts a voltage corresponding to the charge generated by the photoelectric converter into a digital signal by comparing the voltage with a reference voltage that changes with lapse of time,
      a capacitor that holds a threshold voltage based on the voltage corresponding to the charge, and
      a switching circuit that switches whether to perform A/D conversion on a voltage that corresponds to newly generated charge by the photoelectric converter based on a comparison result between the voltage that corresponds to the newly generated charge and the threshold voltage held in the capacitor; and
   an image processing circuit that constructs a new image by updating a pixel value of an image of an immediately previous frame with a pixel value obtained by the A/D conversion.

16. A control method of an image sensor having a plurality of pixels, comprising, in each of the pixels:
   repeatedly generating charge corresponding to an amount of incident light by a photoelectric converter;
   A/D converting by an A/D converter a voltage corresponding to the charge generated by the photoelectric converter into a digital signal by comparing the voltage with a reference voltage that changes with lapse of time;
   holding a threshold voltage based on the voltage corresponding to the charge in a capacitor; and
   switching by a switching circuit whether to perform A/D conversion on a voltage that corresponds to newly generated charge by the photoelectric converter based on a comparison result between the voltage that corresponds to the newly generated charge and the threshold voltage held in the capacitor.

* * * * *